United States Patent [19]

Langlois

[11] Patent Number: 4,936,280

[45] Date of Patent: Jun. 26, 1990

[54] ELECTRONIC DUAL FUEL INJECTION SYSTEM

[76] Inventor: Gérard Langlois, 5908 St Jacques, Neufchatel, Quebec, Canada, G2C 1M6

[21] Appl. No.: 394,612

[22] Filed: Aug. 16, 1989

[30] Foreign Application Priority Data

Aug. 22, 1988 [GB] United Kingdom ............... 8819924

[51] Int. Cl.⁵ ............................................. F02B 15/00
[52] U.S. Cl. .................................. 123/578; 123/179 L; 123/180 T; 123/497; 123/499
[58] Field of Search ........... 123/578, 576, 491, 179 L, 123/180 T, 497, 499, 357

[56] References Cited

U.S. PATENT DOCUMENTS

| | | | |
|---|---|---|---|
| 2,094,662 | 10/1937 | Maniscalco | 123/578 |
| 2,128,006 | 8/1938 | Maniscalco | 123/578 |
| 2,796,056 | 6/1957 | Perkins | 123/578 |
| 4,085,720 | 4/1978 | Etoh | 123/576 |
| 4,421,087 | 12/1983 | Schuurman | 123/1 A |
| 4,499,885 | 2/1985 | Weissenbach | 123/578 |
| 4,499,887 | 2/1985 | Billingsley et al. | 123/575 |

FOREIGN PATENT DOCUMENTS 957581 11/1974 Canada.
1181300 1/1985 Canada.

*Primary Examiner*—E. Rollins Cross

*Attorney, Agent, or Firm*—Edwin E. Greigg

[57] ABSTRACT

There is disclosed an electronic dual-fuel injection system for an internal combustion engine having a cylinder block with driving cylinders. The system has an intake manifold which is connected to the driving cylinders to feed fuel mixtures to the cylinders and an air supply assembly including a shuttle-valve body connected to the manifold for feeding air into it. A high grade fuel supply assembly, which includes an injector mounted on the output section of the air supply assembly, serves for feeding high grade fuel to the manifold. A similar but low grade fuel assembly, which includes a plurality of injectors each of which is mounted on the manifold, serves for feeding low grade fuel to one of the driving cylinders. The injection system also includes a computer, connected to the two fuel supply assemblies, and temperature sensors connected to the computer and to the cylinder block to measure its temperature. The computer is programmed first to cause actuation of the high grade fuel injector for starting and warming the engine up to a predetermined temperature as measured by the temperature sensor and corresponding to the combustion temperature of the low grade fuel. It is also programmed to cause actuation of the low grade fuel injectors to supply low grade fuel to the cylinders after the combustion temperature has been reached and, thereafter, cut-off the high grade fuel supply system.

8 Claims, 1 Drawing Sheet

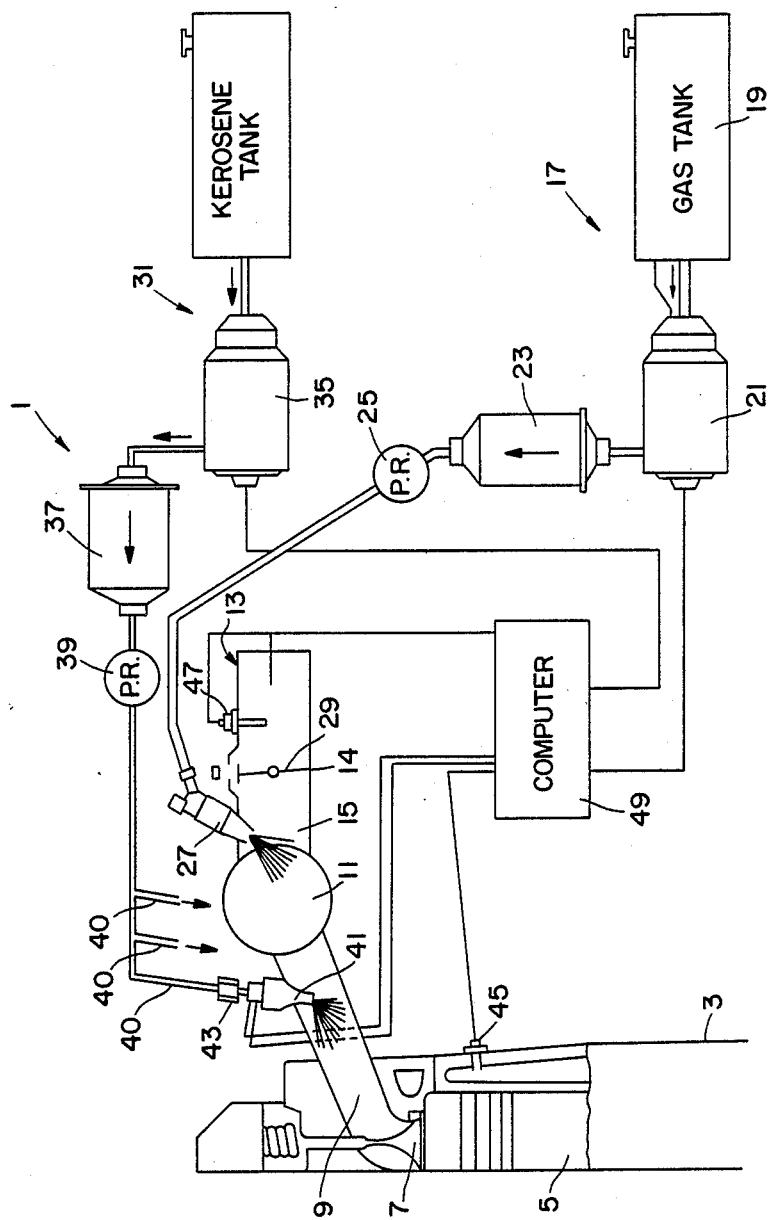

ELECTRONIC DUAL FUEL INJECTION SYSTEM

BACKGROUND OF THE INVENTION

1. Field of the invention

The present invention relates to improvements in fuel injection systems for an internal combustion engine and more particularly to a dual-fuel system capable of alternatively feeding a high grade fuel, such as gasoline, and a low grade fuel, such as kerosene, to the crank-shaft driving cylinders of the engine.

2. Description of the prior art

It has been known for sometime to provide injection systems capable of feeding a more expensive highgrade fuel such as gasoline to an internal combustion engine during starting, idling and low speed driving while a lower grade less expensive fuel, such as kerosene, is used during low or normal speed driving.

Known to the present applicant, in this respect, are the following patents found during a preliminary search:

Canadian Pat. Nos.:

227,467 of 1922
869,814 of 1971
957,581 of 1974
1,181,300 of 1985

U.S. Pat. Nos.:

2,796,056 of 1957
4,499,887 of 1985

The very old Canadian Pat. No. 227,467, shows that the idea of substituting kerosene to gasoline, once the vehicle motor has warmed up, is not new. In this patent, the shift over is obtained by actuating a button on the dash-board. All of the above patents, except Canadian Pat. No. 1,181,300, show various improvements in applying the same principle. The engines, in those patents, are conceived to operate with gasoline when cold or when idling and with kerosene when warmed up or at high speed. Thus, Canadian Patent No. 869,814 discloses a dual injection system of which the control is by means of a cam assembly connected to the throttle valve. In U.S. Pat. No. 2,796,056, injection of kerosene is carried out by the same mechanical arrangement as that used for gasoline.

SUMMARY OF THE INVENTION

The improvements according to the present invention are applicable to a conventional electronic fuel injection system which basically comprises an electric fuel pump capable of providing fuel under pressure; a set of electromechanically operated injectors, one per cylinder, to send fuel into the intake manifold near the intake valves; a computer that determines the amount of fuel to be injected and various sensors measuring engine temperature, speed, intake manifold vacuum, air temperature, etc. Information gathered from these various sensors are fed to the computer which constantly establishes the required air/fuel mixtures necessary to drive the engine under varied operation conditions. The computer controls, through adequate signals, operation of the fuel injectors, among others.

An object of the present invention lies in providing an electronic fuel injection system of the above general type having a high grade fuel supply assembly (gasoline) including an injector mounted at the outlet end of the shuttle valve body and a low grade fuel supply assembly (kerosene) including a plurality of injectors, each of which feeding into the driving cylinders when the intake valves are opened. As noted, both types of injectors are located on the downstream side of the shuttle valve in the corresponding body.

Another object of the invention is to provide such a system wherein the computer is programmed to cause running of the engine with gasoline, when starting and at low speed, until the cylinder block is heated to the combustion temperature of the kerosene at which time the engine is made to run with both gasoline and kerosene for short time of about two seconds and, thereafter, the computer causes the gasoline fuel supply assembly to be cut off.

Yet another object of the invention lies in the provision of the above system wherein the computer is also programmed to actuate the low-grade fuel injectors to provide low grade fuel in spirts of about 2 seconds duration at about 9 seconds intervals.

More specifically, the invention concerns an electronic dual-fuel injection system for an internal combustion engine having a cylinder block including driving cylinders, the system essentially comprising:

intake manifold means operatively connected to the driving cylinders to feed fuel mixtures thereto;

an air supply assembly having a shuttle-valve body including a tubular output section connected to the manifold means for feeding air thereto;

a high grade fuel supply assembly, including an injector mounted on the output section of the air supply assembly for feeding high grade fuel to the manifold means, and a low grade fuel supply assembly including a plurality of injectors, each of the injectors being mounted on the manifold means for feeding low grade fuel to one of the driving cylinders.

The system preferably comprises:

computer means operatively connected to the fuel supply assemblies and including a computer and temperature sensor means operatively connected to the computer and to the cylinder block to measure the temperature thereof;

wherein the computer is programmed first to cause actuation of the high grade fuel injector for supplying high grade fuel to the cylinders, through the manifold means, for starting the engine and warming the engine up to a predetermined temperature, as measured by the temperature sensor means and corresponding to the combustion temperature of the low grade fuel and, second, to cause actuation of the low grade fuel injectors to supply low grade fuel to the cylinders after the predetermined temperature has been reached, and thereafter cut-off the high grade fuel supply system.

Other features and advantages of the invention will become apparent from the description that follows of a preferred embodiment having reference to the appended single FIGURE of drawing illustrating a diagram of part of an electronic dual-fuel injection system incorporating the improvements of the invention.

DESCRIPTION OF THE PREFERRED EMBODIMENT

The illustrated fuel injection system 1 is, as said above, designed to allow operation of an internal combustion engine with two different fuels; for example, an inexpensive low grade fuel such as kerosene and a more expensive high grade fuel such as gasoline. It incorporates the above noted improvements capable of lowering the operating costs of the engine as well as reducing the emission of polluting gases.

The invention is represented here by a portion 3 of its cylinder block cut away to illustrate one driving cylinder 5 of which the fuel mixture intake port is shown closed by an intake valve 7. Each valve 7 is located at the lower end of an intake or admission pipe 9 of which the other end is connected to and in communication with a longitudinal manifold tube 11. The admission pipes 9 are all connected to and in communication with this tube 11. The admission pipes 9 and the tube 11 form a manifold structure or means in the fuel mixture injection system. Air is supplied by an assembly 13 including a throttle valve body 14 of which the tubular output section 15 is connected to and in communication with the manifold tube 11.

A high grade fuel, such as gasoline, is fed by means of a supply assembly 17 comprising a fuel reservoir 19 connected to an electric pump 21 delivering to a fuel filter 23 of which the output is connected to a pressure regulator 25 adapted to hold the gasoline pressure constant. Thence, gasoline is sent to an electromechanically operated injector 27 for spirting it into the outlet air conduit 15 where the required air/gasoline mixtures are formed. It will be noted that the injector 27 is located downstream of a throttle valve 29, in the body 14.

A low grade fuel, such as kerosene, is fed by means of a supply assembly 31 comprising a kerosene reservoir 33 connected to an electric pump 35 sending the kerosene, through a filter 37, a pressure regulator 39 and pipe branches 40, to a series of electro-mechanically operated injectors 41, each one of which is mounted on one of the admission pipes 9 leading to an intake valve 7. A heating element 43 is mounted on each pipe branch 40 for bringing the temperature of the kerosene to its combustion temperature prior to being atomized into the admission pipes 9 by the injectors 41.

A temperature sensor 45 is connected to the cylinder block 3 to measure the block temperature and hence the temperature of the cooling liquid. Another temperature sensor 47 is mounted on the throttle valve body 14 to measure the temperature of the air serving in the fuel mixtures. These sensors, along with the heating elements 43 and the pumps 21, 35, are, in turn, operatively connected to a computer 49 of a central control unit or computer means.

Apart from being responsible for the controlled operation of the pumps 21, 35, the computer 49 is programmed first to cause actuation of the high grade fuel injector 27 to supply gasoline to the cylinders 5, through the manifold means 9, 11, for starting the engine and warming it up to a temperature, as measured by the sensor 45, corresponding to the combustion temperature of the low grade fuel, i.e. the kerosene. Secondly, once this temperature is reached, the computer 21 commands the kerosene injectors 41 to open, after the heating elements 43 have raised the kerosene temperature to its ignition temperature, by order from the computer. Thereafter, the computer 21 orders closing of the gasoline injector 27.

The computer is preferably programmed to actuate the injectors 41 to provide kerosene spirts of about 2 seconds duration at about 9 seconds intervals. As the intake valves 7 are not opened at each spirting of the injectors 13, 27, but in sequence according to their position relative to the cranks of the crankshaft, the fuel injected on the top of the closed valves 7 accumulates in the admission pipes 9 until they open. The computer is also preferably programmed so that it causes the gasoline injector to close two seconds after the combustion temperature of the kerosene is reached, that is two seconds after the kerosene injectors 41 have come into action.

It may be added that the throttle valve 14, located upstream of the injectors 27, 41, is operatively controlled by the computer 49 in conventional manner to provide the air necessary in the air/fuel mixtures required for the changing operating conditions of the engine.

I claim:

1. An electronic dual-fuel injection system for an internal combustion engine having a cylinder block including driving cylinders, said system comprising:
   intake manifold means operatively connected to said driving cylinders to feed fuel mixtures thereto;
   an air supply assembly having a shuttle-valve body including a tubular output section connected to said manifold means for feeding air thereto;
   a high grade fuel supply assembly, including an injector mounted on said output section of said air supply assembly for feeding high grade fuel to said manifold means, and
   a low grade fuel supply assembly including a plurality of injectors, each of said injectors being mounted on said manifold means for feeding low grade fuel to one of said driving cylinders.

2. A system as claimed in claim 1, further comprising:
   computer means operatively connected to said fuel supply assemblies and including a computer and temperature sensor means operatively connected to said computer and to said cylinder block to measure the temperature thereof;
   wherein said computer is programmed first to cause actuation of said high grade fuel injector for supplying high grade fuel to said cylinders, through said manifold means, for starting said engine and warming said engine up to a predetermined temperature, as measured by said temperature sensor means and corresponding to the combustion temperature of said low grade fuel and, second, to cause actuation of said low grade fuel injectors to supply low grade fuel to said cylinders after said predetermined temperature has been reached, and thereafter cut off said high grade fuel supply system.

3. A system as claimed in claim 2, wherein said intake manifold means comprise:
   an elongated manifold tube connected to said tubular output section of said air supply assembly to receive air therefrom;
   admission pipes, each pipe being connected at one end to said manifold tube to receive air therefrom and being connected at the other end to one of said driving cylinders, and
   wherein said low grade fuel injectors are each operatively connected to one of said admission pipes to inject low grade fuel therein.

4. A system as claimed in claim 3, further including heating means in said low grade fuel supply assembly for heating said low grade fuel to said predetermined temperature.

5. A system as claimed in claim 4, further including a throttle valve operatively connected to and controlled by said computer and located upstream of said high grade fuel injector.

6. A system as claimed in claim 3, wherein said computer is further programmed to actuate said low-grade fuel injectors to provide low grade fuel in spirts of about 2 seconds duration at about 9 seconds intervals.

7. A system as claimed in claim 3, wherein said computer is additionally programmed to cut off said high grade fuel supply injector about two seconds after said predetermined temperature is reached.

8. A system as claimed in claim 6, wherein said computer is additionally programmed to cut off said high grade fuel supply injector about two seconds after said predetermined temperature is reached.

* * * * *